Patented Dec. 24, 1940

2,226,512

UNITED STATES PATENT OFFICE 2,226,512

LUMINESCENT MATERIAL

George E. Holman, Melrose, Mass., assignor to Hygrade Sylvania Corporation, a corporation of Massachusetts No Drawing. Application May 11, 1940, Serial No. 334,651

1 Claim. (Cl. 250—81)

This invention relates to electric gaseous discharge lamps and particularly to the preparation of fluorescent materials used in the coating of such lamps.

An object of the invention is to provide such a lamp with an extremely smooth coating of luminescent material on the interior of its envelope.

Another object is the securing of a luminescent coating for such a lamp which will emit a blue-white light combining the qualities of high efficiency and good maintenance.

Much difficulty has been encountered in the preparation of a fluorescent material which will emit a blue-white light having a high efficiency and a good maintenance when excited by the ultra-violet rays emitted as a result of the discharge between the electrodes of an electric gaseous discharge lamp.

One of the best known luminescent materials for obtaining a blue-white light, is magnesium tungstate. However, when we use magnesium tungstate as it is usually prepared, high efficiency and good maintenance cannot be obtained. I have, therefore, used an excess of magnesium carbonate in my reaction mixture and, as a result, I have a small percentage of magnesium oxide along with the magnesium tungstate in the finished product.

In the preparation of this material, I start with tungstic acid and a quantity of magnesium carbonate in excess of the amount theoretically necessary to obtain magnesium tungstate. The two chemicals are brought together in distilled water maintained at a temperature of 80° to 85° C. and the mixture kept strongly agitated, the mixer turning at about 400 R. P. M., for example. The reaction takes from thirty to forty-five minutes and the end-point is indicated by a jellying tendency of the mixture. The mixture is then filtered and the precipitate washed three times in hot water and three times in alcohol in order to remove any soluble impurities. The precipitate is then dried, ground, and fired at 1550° F. for from two to three hours.

With a theoretically pure magnesium carbonate ($MgCO_3$), the reactions involved in the preparation of magnesium tungstate would be as follows:

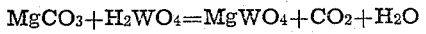

However, magnesium carbonate, as manufactured, always contains the basic carbonate $3MgCO_3.Mg(OH)_2.3H_2O$ and the reaction mixture is calculated to magnesium oxide.

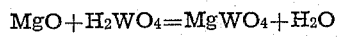

The quantity of this basic magnesium carbonate used should be of an amount sufficient to yield an excess up to 3% of magnesium oxide in the finished product. The quantity of magnesium oxide present in the magnesium carbonate used is determined by analysis. The excess of magnesium oxide in the finished product may act as an activator yet its exact function is not accurately known. However, I have found that with this small amount of magnesium oxide present along with the magnesium tungstate, a very appreciable increase in the luminous efficiency and the maintenance is obtained.

The determination of 3% as a critical point was arrived at by experiments which showed that when an excess up to about 3% of magnesium oxide was used an increase in luminous efficiency and maintainance was noted. When an excess greater than 3% was used a decrease was noted in the maintenance and efficiency. Any appreciable change in the 1550° F. firing temperature, either above or below will also result in a decrease in luminous efficiency and maintenance.

What I claim is:

The method of manufacturing a luminescent material which comprises: mixing tungstic acid and magnesium carbonate in distilled water, the magnesium carbonate being in excess of the amount necessary to convert the tungstic acid to magnesium tungstate; agitating the mixture until it shows a jellying tendency; then filtering out the precipitate; washing the latter in hot water washing it in alcohol; drying it; grinding it; and firing it at about 1550° F. for two to three hours.

GEORGE E. HOLMAN.